US012103482B2

(12) United States Patent
Kang

(10) Patent No.: US 12,103,482 B2
(45) Date of Patent: Oct. 1, 2024

(54) CURTAIN AIRBAG APPARATUS HAVING TWIST PREVENTION STRUCTURE

(71) Applicant: HYUNDAI MOBIS CO., LTD., Seoul (KR)

(72) Inventor: Dong Ho Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/886,519

(22) Filed: Aug. 12, 2022

(65) Prior Publication Data

US 2023/0065990 A1 Mar. 2, 2023

(30) Foreign Application Priority Data

Aug. 26, 2021 (KR) ........................ 10-2021-0113378

(51) Int. Cl.
*B60R 21/201* (2011.01)
*B60R 21/232* (2011.01)
*B60R 21/2346* (2011.01)
*B60R 21/237* (2006.01)
*B60R 21/2338* (2011.01)
*B60R 21/235* (2006.01)

(52) U.S. Cl.
CPC .......... *B60R 21/201* (2013.01); *B60R 21/232* (2013.01); *B60R 21/2346* (2013.01); *B60R 21/237* (2013.01); *B60R 2021/23388* (2013.01); *B60R 21/235* (2013.01); *B60R 2021/23538* (2013.01)

(58) Field of Classification Search
CPC ... B60R 21/201; B60R 21/232; B60R 21/237; B60R 21/235; B60R 2021/23388
See application file for complete search history.

(56) References Cited

U.S. PATENT DOCUMENTS

| 5,761,995 A * | 6/1998 | Laiserin ................. B60R 21/215 280/728.1 |
| 11,040,690 B2 * | 6/2021 | Montgomery ........ B60R 21/232 |
| 2011/0042923 A1 * | 2/2011 | Hatfield ................ B60R 21/213 280/730.2 |
| 2013/0113192 A1 * | 5/2013 | Richards ............... B60R 21/235 280/730.2 |
| 2022/0024404 A1 * | 1/2022 | Moran ................... B60R 21/232 |

FOREIGN PATENT DOCUMENTS

| CN | 211765401 U * | 10/2020 | ........... B60R 21/201 |
| DE | 202020101968 U1 * | 6/2020 | ........... B60R 21/201 |
| KR | 20030097137 A | 12/2003 | |

OTHER PUBLICATIONS

DE-202020101968-U1 Machine English translation (Year: 2020).*
CN211765401U Machine English translation (Year: 2019).*

* cited by examiner

*Primary Examiner* — James A English
*Assistant Examiner* — Matthew James O'Neill
(74) *Attorney, Agent, or Firm* — NovoTechIP International PLLC

(57) ABSTRACT

The present disclosure relates to a curtain airbag apparatus having a twist prevention structure, and it is possible to mark a strap line 300 extending in a straight shape on a strap part 210 of a tab strap 200 for fixing a curtain airbag cushion 100 folded in a roll form, and easily check whether the curtain airbag cushion 100 folded in the roll form is twisted with the naked eye through the strap line 300.

12 Claims, 5 Drawing Sheets

CURTAIN AIRBAG APPARATUS HAVING TWIST PREVENTION STRUCTURE

CROSS-REFERENCE TO RELATED APPLICATIONS

The present application claims the benefit of priority of Korean Patent Application No. 10-2021-0113378 filed Aug. 26, 2021, the disclosure of which is incorporated herein by reference in its entirety.

TECHNICAL FIELD

The present disclosure relates to a curtain airbag apparatus having a twist prevention structure, and more specifically, to a curtain airbag apparatus having a twist prevention structure, which may easily check whether a folded curtain airbag cushion is twisted with the naked eye, and furthermore, prevent twist when the curtain airbag cushion is folded.

BACKGROUND

In general, various types of airbag apparatuses are provided in a vehicle to protect passengers in the event of accidents, and among them, a curtain airbag apparatus is an apparatus mounted on a side panel of a vehicle body, having an airbag cushion unfolded and deployed downward in the event of vehicle rollover or side collision accident, and having the deployed curtain airbag cushion that protects passengers.

When the curtain airbag apparatus is fixedly installed on a vehicle body pillar part, the curtain airbag cushion is in a state of being rolled in a roll form and folded, and the curtain airbag cushion folded in the roll form is fixed by a tab strap to maintain the folded state.

Meanwhile, the curtain airbag cushion may be folded in a twisted state when folded in the roll form because it has a long length in front and rear directions of the vehicle, and as described above, when the curtain airbag cushion is folded in the twisted state, there is a concern in that the curtain airbag cushion may not smoothly perform the deployment operation in the event of accidents, and accordingly, a problem that may not effectively protect the passengers occurs.

The matters explained as the background art are for the purpose of enhancing the understanding of the background of the present disclosure and should not be taken as acknowledging that they correspond to the related art already known to those skilled in the art.

SUMMARY

An object of the present disclosure is to provide a curtain airbag apparatus having a twist prevention structure, which may easily check whether a folded in a roll form curtain airbag cushion is twisted with the naked eye, and furthermore, prevent twist when the curtain airbag cushion is folded, so that it is possible to enable a smooth deployment operation of a curtain airbag cushion in the event of accidents, thereby protecting passengers more effectively.

To achieve the object, a curtain airbag apparatus having a twist prevention structure according to the present disclosure includes: a curtain airbag cushion; a tab strap coupled to the curtain airbag cushion, and surrounding the curtain airbag cushion folded in a roll form to maintain the folded state of the curtain airbag cushion; and a strap line provided on the tab strap to check whether the curtain airbag cushion folded in the roll form is twisted with the naked eye.

An upper end of the curtain airbag cushion is provided with a cushion diffuser pocket part to which an inflator is connected, and the tab strap is coupled to extend from the upper end of the curtain airbag cushion in front and rear directions.

The tab strap is divided into two or more and coupled to the curtain airbag cushion.

The tab strap includes: a strap part surrounding the curtain airbag cushion folded in the roll form; and a mounting tab part extending by passing through the strap part, and the curtain airbag cushion, the strap part, and the mounting tab part are integrally coupled by a sewing.

A plurality of mounting tab parts are provided on one strap part to be spaced apart at certain intervals.

A mounting tab part positioned closest forward from the cushion diffuser pocket part and a mounting tab part positioned closest backward therefrom are connected through the same one strap part.

The strap part is provided with a tear line that induces breakage of the strap part with a deployment pressure of the curtain airbag cushion.

The strap line is marked on the strap part in a straight shape in front and rear directions.

The strap line is marked on the strap part in a straight shape in front and rear directions and a plurality of strap lines are marked in parallel.

The plurality of strap lines are marked in different colors.

The strap part is provided with a vehicle model mark part that informs vehicle model information on which the curtain airbag cushion is to be mounted.

The strap part is provided with a position mark part that informs upper and lower position information of the tab strap.

The curtain airbag apparatus having the twist prevention structure according to the present disclosure has a configuration of marking the strap line extending in the straight shape on the strap part of the tab strap for fixing the curtain airbag cushion folded in the roll form, and may easily check whether the curtain airbag cushion folded in the roll form is twisted with the naked eye through the strap line.

In addition, the embodiment of the present disclosure provides the configuration that may prevent the curtain airbag cushion from being folded in the twisted state by checking whether the curtain airbag cushion is twisted when the curtain airbag cushion is folded through the strap line marked on the strap part in the straight shape, so that it is possible to protect the passengers more effectively by enabling the smooth deployment operation of the curtain airbag cushion in the event of accidents.

In addition, the embodiment of the present disclosure provides the configuration that connects the front mounting tab part positioned closest forward from the cushion diffuser pocket part and the rear mounting tab part positioned closest backward from the cushion diffuser pocket part with the same one strap part, and marks the strap line on the strap part connecting the front mounting tab part and the rear mounting tab part in the straight shape in the front and rear directions, so that it is possible to easily check the twisted state of the curtain airbag cushion folded in the roll form with the naked eye even at the portion where the cushion diffuser pocket part is positioned.

BRIEF DESCRIPTION OF THE DRAWINGS

The above and other objects, features and other advantages of the present disclosure will be clearly understood from the following detailed description when taken in conjunction with the accompanying drawings, in which.

DETAILED DESCRIPTION

Figure 1:
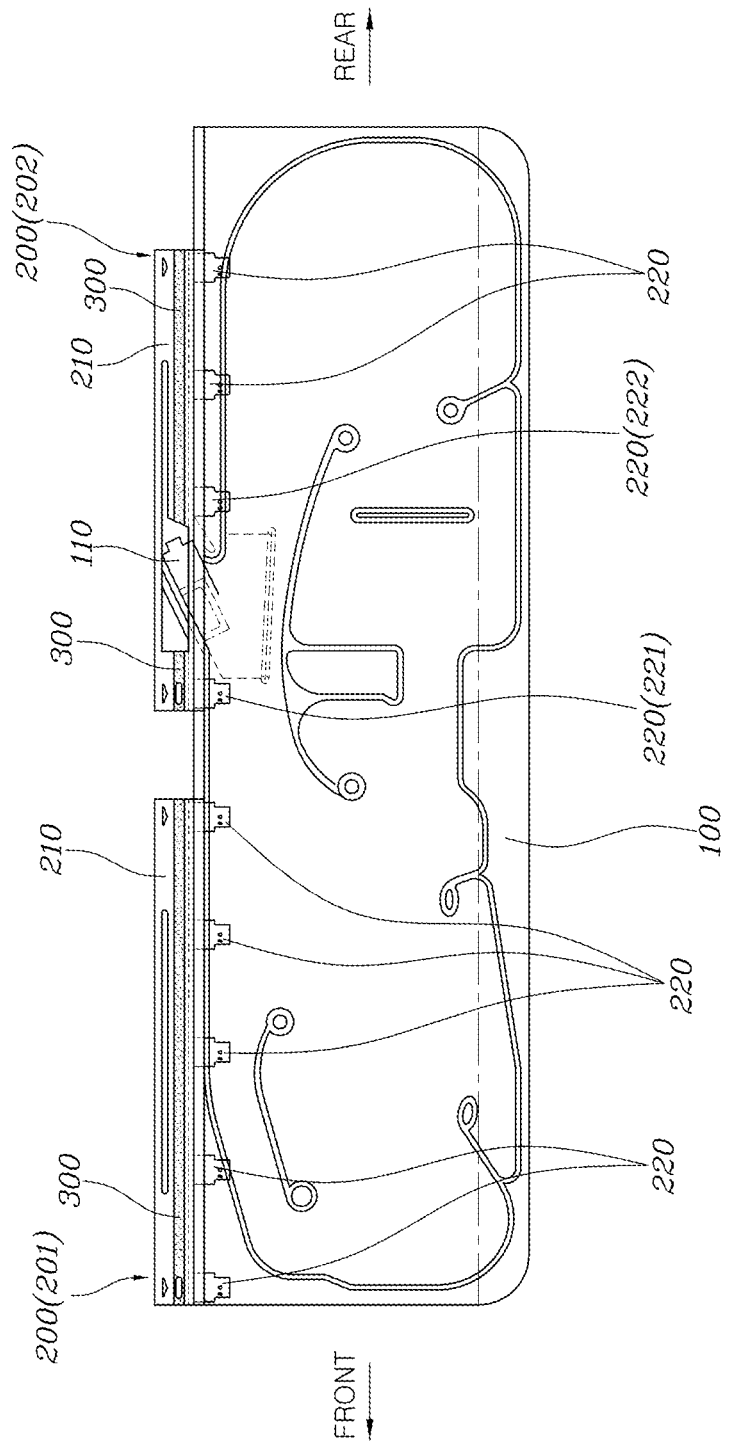
FIG. 1 is a view for describing a curtain airbag apparatus having a twist prevention structure according to the present disclosure, and a view of a state before a curtain airbag cushion is folded.

Specific structural or functional descriptions for exemplary embodiments of the present disclosure disclosed in the present specification or application are only exemplified for the purpose of describing the exemplary embodiments according to the present disclosure, and the exemplary embodiments according to the present disclosure may be carried out in various forms and should not be interpreted as being limited to the exemplary embodiments described in the present specification or application.

Since the exemplary embodiment according to the present disclosure may have various changes and have various forms, specific exemplary embodiments will be shown in the drawings and described in detail in the present specification or application. However, this is not intended to limit the exemplary embodiments according to the concept of the present disclosure to a specific disclosed form, and should be understood to include all changes, equivalents, or substitutes included in the spirit and technical scope of the present disclosure.

Terms such as first and/or second may be used to describe various components, but the components should not be limited to the terms. The terms are used only for the purpose of distinguishing one component from other components, and for example, a first component may be referred to as a second component, and similarly, the second component may also be referred to as the first component, without departing from the scope according to the concept of the present disclosure.

When a certain component is said to be "connected" or "coupled" to another component, it should be understood that the certain component may be directly connected or coupled to another component, but other components may also exist therebetween. On the other hand, when a certain component is said to be "directly connected to" or "directly coupled to" another component, it should be understood that other components do not exist therebetween. Other expressions for describing the relationship between components, that is, expressions such as "between" and "directly between" or "adjacent to" and "directly adjacent to" should also be interpreted in the same manner.

The terms used in the present specification are only used to describe the specific exemplary embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof, and do not exclude the presence or addition possibility of one or more other features, numbers, steps, operations, components, parts, or a combination thereof in advance.

Unless defined otherwise, all terms used herein, including technical or scientific terms, have the same meaning as commonly understood by those skilled in the art to which the present disclosure pertains. Terms such as those defined in commonly used dictionaries should be interpreted as having meanings consistent with the meanings in the context of the related art, and are not interpreted as an ideal or excessively formal meaning unless explicitly defined in the present specification.

A control part (controller) according to an exemplary embodiment of the present disclosure may be implemented through a non-volatile memory (not shown) configured to store data regarding an algorithm configured to control the operation of various components of a vehicle or software instructions for reproducing the algorithm and a processor (not shown) configured to perform operations described below using the data stored in the corresponding memory. Here, the memory and the processor may be implemented as a separate chip. Alternatively, the memory and the processor may be implemented as a single chip integrated with each other. A processor may take the form of one or more processors.

Hereinafter, a curtain airbag apparatus having a twist prevention structure according to preferred embodiments of the present disclosure will be described with reference to the accompanying drawings.

As shown in FIGS. 1 to 5, the curtain airbag apparatus having the twist prevention structure according to the present disclosure includes: a curtain airbag cushion 100; a tab strap 200 coupled to the curtain airbag cushion 100 and surrounding the curtain airbag cushion 100 in a roll-folded state to maintain the folded state of the curtain airbag cushion 100; and a strap line 300 provided on the tab strap 200 to allow a person (e.g., a factory worker, inspector, mechanic, driver, etc.) to visually check whether the curtain airbag cushion 100 in the roll-folded state is twisted with the person's naked eye.

A cushion diffuser pocket part 110 is provided at an upper end of the curtain airbag cushion 100, and an inflator configured to generate airbag gas at operation is connected to the cushion diffuser pocket part 110.

The curtain airbag apparatus is installed to be positioned on a vehicle body above a pillar part, the curtain airbag cushion 100 in the roll-folded state is deployed to be unfolded by receiving the airbag gas generated when the inflator is operated, and passengers are protected by the deployed curtain airbag cushion 100.

When the curtain airbag apparatus is fixedly installed to the pillar part of the vehicle body, the curtain airbag cushion 100 is in a state of being rolled in the roll shape and folded, and the folded curtain airbag cushion 100 maintains the folded state by the tab strap 200.

The tab strap 200 according to the present disclosure is coupled to extend from the upper end of the curtain airbag cushion 100 in the front and rear directions, and for a robust coupling structure with the curtain airbag cushion 100, the tab strap 200 preferably has a structure that is divided into two or more and coupled to the curtain airbag cushion 100.

In other words, in the embodiment according to the present disclosure, the tab strap 200 has a structure in which the tab strap 200 is divided into a front tab strap 201 and a rear tab strap 202, and the front tab strap 201 and the rear tab strap 202 are coupled to the upper end of the curtain airbag cushion 100 to be spaced apart from each other in the front and rear directions.

The tab strap 200 has the structure in which the front tab strap 201 is coupled to an upper front portion of the curtain airbag cushion 100, and the rear tab strap 202 is coupled to an upper rear portion of the curtain airbag cushion 100, it is possible to maintain a robust coupling structure with the curtain airbag cushion 100 by the front tab strap 201 and the rear tab strap 202.

The tab strap 200 includes a strap part 210 surrounding the curtain airbag cushion 100 in the roll-folded state, and a mounting tab part 220 extending by passing through the strap part 210.

The mounting tab part 220 may be coupled to a lamp bracket after passing through the strap part 210 or directly and fixedly coupled to the vehicle body via a coupling member such as a bolt or a screw.

When the tab strap 200 is coupled to the lamp bracket, the lamp bracket is fixedly coupled to the vehicle body via coupling members such as a bolt and a screw.

The curtain airbag cushion 100 and the tab strap 200 are integrated by the coupling of a sewing 400, that is, have a structure in which the curtain airbag cushion 100 and a lower end of the strap part 210 and an upper end of the mounting tab part 220 are integrally coupled by the sewing 400.

The embodiment according to the present disclosure provides a structure in which a plurality of mounting tab parts 220 are provided to be spaced apart from each other at certain intervals in the front and rear directions on one strap part 210, which may robustly fix the curtain airbag cushion 100 in the roll-folded state in a longitudinal direction using the plurality of mounting tab parts 220.

The mounting tab part 220 positioned closest forward from the cushion diffuser pocket part 110 provided in the curtain airbag cushion 100 becomes a front mounting tab part 221, and the mounting tab part 220 positioned closest backward from the cushion diffuser pocket part 110 becomes a rear mounting tab part 222, in which the front mounting tab part 221 and the rear mounting tab part 222 have a structure in which they are connected to each other through the same one strap part 210, that is, the strap part 210 of the rear tab strap 202.

In addition, the strap line 300 according to the present disclosure has a structure that is marked on the strap part 210 in the straight shape in the front and rear directions.

Conventionally, it is not possible to mark the strap line passing through the cushion diffuser pocket part because the tab strap is divided on the front and rear sides, respectively, with respect to the cushion diffuser pocket part, so that there is a problem in that it is difficult to easily check the twisted state of the curtain airbag cushion in the roll-folded state with the naked eye on the portion where the cushion diffuser pocket part is positioned.

In contrast, the embodiment according to the present disclosure provides a configuration that connects the front mounting tab part 221 positioned closest forward from the cushion diffuser pocket part 110 and the rear mounting tab part 222 positioned closest backward from the cushion diffuser pocket part 110 with the same one strap part 210, and marks the strap line 300 on the strap part 210 connecting the front mounting tab part 221 and the rear mounting tab part 222 in the straight shape in the front and rear directions, and there is an advantage in that it is possible to easily check the twisted state of the curtain airbag cushion 100 in the roll-folded state even on the portion where the cushion diffuser pocket part 110 is positioned with the naked eye.

Figure 2:
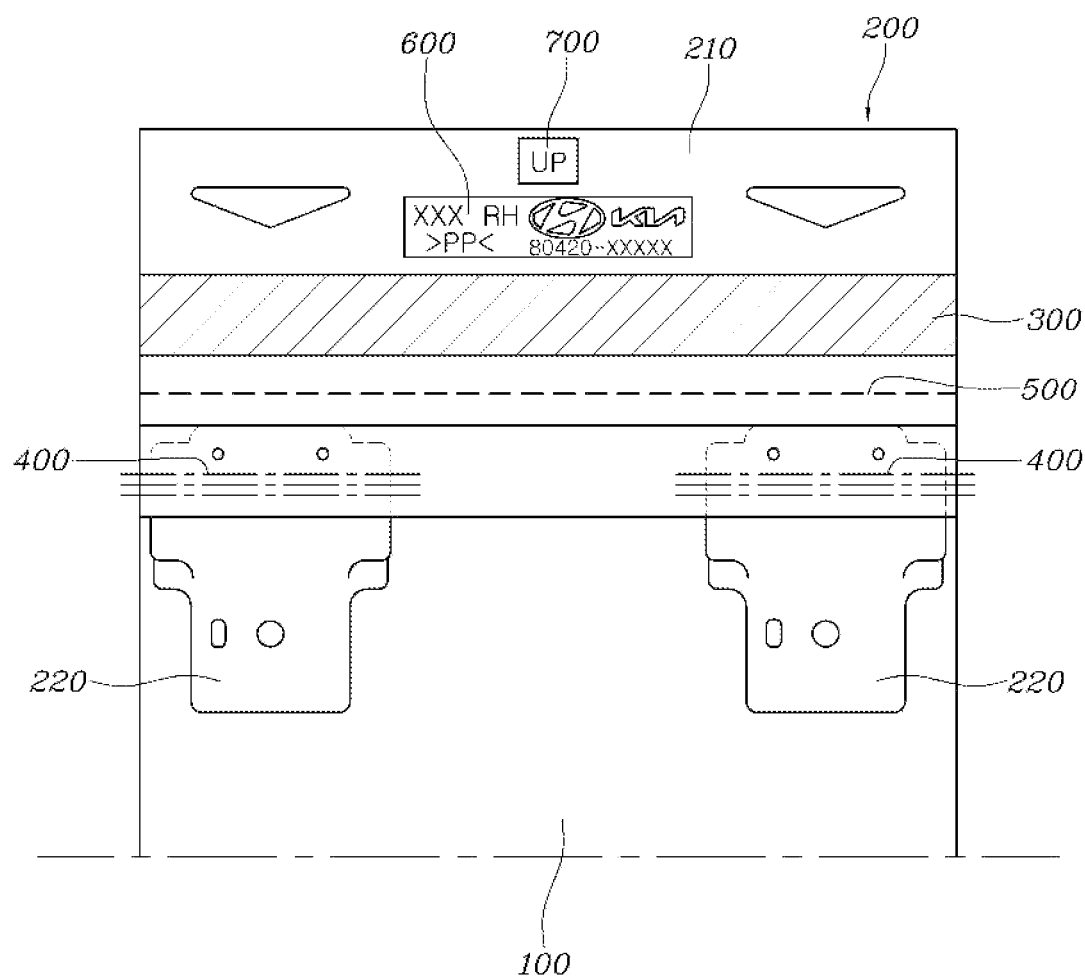
FIG. 2 is an enlarged view of a portion where a tab strap is coupled in FIG. 1.
Figure 3:
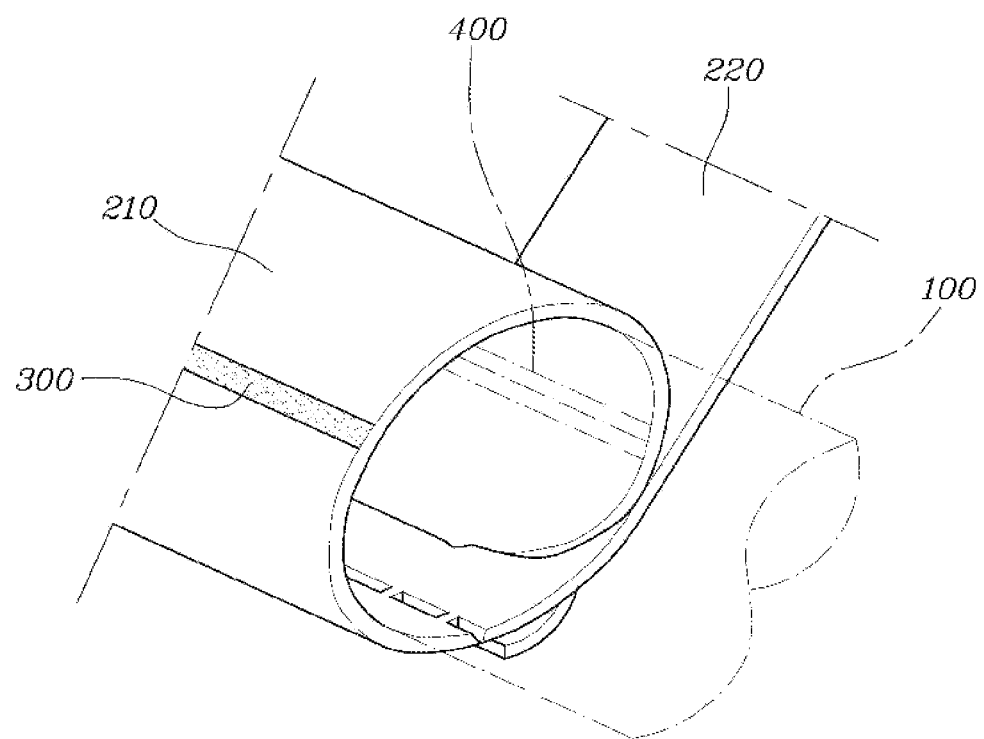
FIG. 3 is a view of a state in which the curtain airbag cushion is folded in the roll form.
Figure 4:
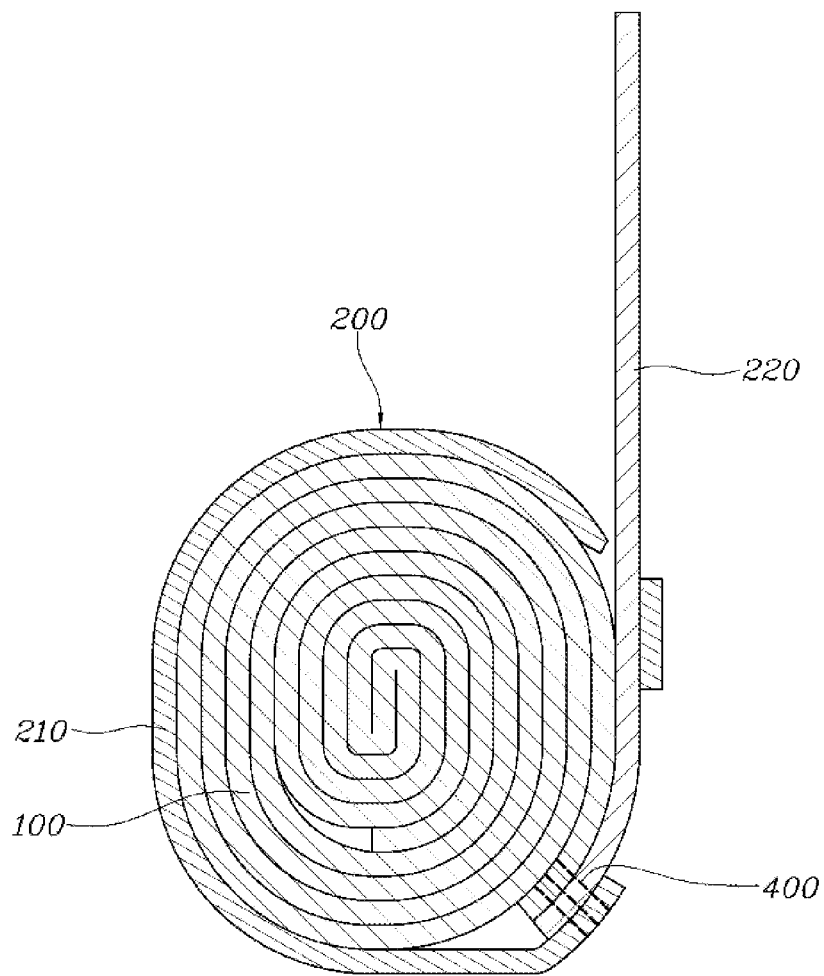
FIG. 4 is a cross-sectional view of FIG. 3.
Figure 5:
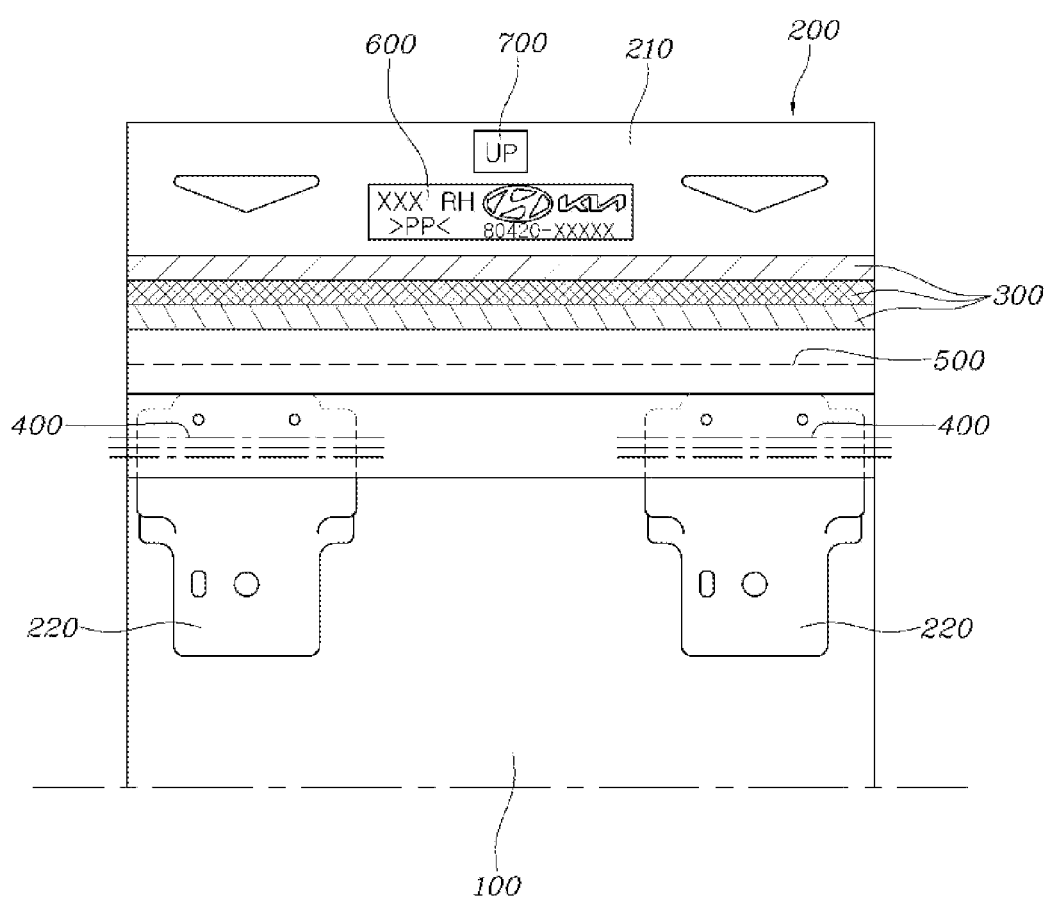
FIG. 5 is a view showing that a plurality of strap lines are marked according to another embodiment of the present disclosure.

The strap line 300 according to the present disclosure is marked to connect from the front end to the rear end of the strap part 210 in the straight shape, and the reason that the strap line is marked in the straight shape is to easily check the twisted state of the curtain airbag cushion 100 in the roll-folded state with the naked eye, and the strap line 300 may be marked in one line having one specific color as shown in FIG. 2, or the plurality of strap lines 300 may be marked in parallel as shown in FIG. 5, and the plurality of marked strap lines 300 are marked in different colors to make it easier to check the twisted state of the curtain airbag cushion 100 with the naked eye.

The strap part 210 of the tab strap 200 according to the present disclosure is provided with a tear line 500 that induces breakage of the strap part 210 with a deployment pressure of the curtain airbag cushion 100, and the tear line 500 is formed to connect from the front end to the rear end of the strap part 210.

In addition, the strap part 210 of the tab strap 200 according to the present disclosure may be provided with a vehicle model mark part 600 that shows vehicle model information that the curtain airbag cushion 100 is to be mounted, and also a position mark part 700 that indicates upper and lower position information of the tab strap 200.

The vehicle model mark part 600 may be marked including characters, figures, symbols, numbers, and the like, and the position mark part 700 may be marked with characters such as UP and DOWN, symbols such as arrows and figures, or the like.

As described above, the curtain airbag apparatus having the twist prevention structure according to the embodiment of the present disclosure has the configuration that marks the strap line 300 extending in the straight shape on the strap part 210 of the tab strap 200 for fixing the curtain airbag cushion 100 in the roll-folded state, and there is an advantage in that it is possible to easily check whether the curtain airbag cushion 100 in the roll-folded state is twisted with the naked eye through the strap line 300.

In addition, the embodiment of the present disclosure provides the configuration capable of preventing the curtain airbag cushion 100 from being folded in the twisted state by checking whether the curtain airbag cushion 100 is twisted when the curtain airbag cushion 100 is folded through the strap line 300 marked on the strap part 210 in the straight shape, so that it is possible to protect the passengers more effectively by enabling the smooth deployment operation of the curtain airbag cushion 100 in the event of accidents.

In addition, the embodiment of the present disclosure provides the configuration that connects the front mounting tab part 221 positioned closest forward from the cushion diffuser pocket part 110 and the rear mounting tab part 222 positioned closest backward from the cushion diffuser pocket part 110 with the same one strap part 210, and marks the strap line 300 on the strap part 210 connecting the front mounting tab part 221 and the rear mounting tab part 222 in the straight shape in the front and rear directions, so that it is possible to easily check the twisted state of the curtain airbag cushion 100 in the roll-folded ed state with the naked eye even at the portion where the cushion diffuser pocket part 110 is positioned.

Although the specific exemplary embodiments of the present disclosure have been shown and described, it will be apparent to those skilled in the art that the present disclosure may be variously improved and changed without departing from the technical spirit of the present disclosure provided by the appended claims.

What is claimed is:

1. A curtain airbag having a twist prevention structure, comprising:

a curtain airbag cushion in a roll-folded state;

a tab strap coupled to and surrounding the curtain airbag cushion and configured to maintain the curtain airbag cushion in the roll-folded state, the tab strap including:
a strap surrounding the curtain airbag cushion; and
a plurality of mounting tabs connected to the strap and spaced apart from each other along the strap; and
a strap line disposed on the strap; and
a cushion diffuser pocket disposed at an upper end portion of the curtain airbag cushion, adjacent to the strap and the strap line,
wherein the plurality of mounting tabs includes:
a first mounting tab connected to the strap at a position closest to the cushion diffuser pocket in a first direction; and
a second mounting tab connected to the strap at a position closest to the cushion diffuser pocket in a second direction opposite to the first direction so that the first and second mounting tabs are on opposite sides of the cushion diffuser pocket,
wherein the strap connects the first and second mounting tabs to one another, and
wherein the strap line is configured to be marked on the strap in a straight line to extend continuously along the strap at least in a first area of the strap connecting the first and second mounting tabs to one another to allow a person to visually check whether the curtain airbag cushion in the roll-folded state is twisted in the first area of the strap connecting the first and second mounting tabs adjacent to the cushion diffuser pocket.

2. The curtain airbag of claim 1, further comprising:
an inflator coupled to the cushion diffuser pocket,
wherein the tab strap is coupled to and extends from the upper end portion of the curtain airbag cushion in front and rear directions of the curtain airbag cushion.

3. The curtain airbag of claim 2, wherein the tab strap is divided into a plurality of portions.

4. The curtain airbag of claim 2, wherein the curtain airbag cushion, the strap, and the plurality of mounting tabs are configured to be integrally coupled by a sewing.

5. The curtain airbag of claim 4, wherein the strap includes a tear line configured to tear off by a deployment pressure of the curtain airbag cushion.

6. The curtain airbag of claim 4, wherein the strap line comprises a straight line marked on the strap in front and rear directions of the strap.

7. The curtain airbag of claim 4, wherein the strap line includes a plurality of strap lines marked on the strap and extending parallel to each other through the first area of the strap connecting the first and second mounting tabs to one another adjacent to the cushion diffuser pocket.

8. The curtain airbag of claim 7, wherein the plurality of strap lines are of different colors.

9. The curtain airbag of claim 4, wherein the strap includes a vehicle model mark showing vehicle model information.

10. The curtain airbag of claim 4, wherein the strap includes a position mark indicating upper and lower positions of the strap.

11. The curtain airbag of claim 5, wherein the tear line is located on the strap between the strap line and connection points of the plurality of mounting tabs to separate the strap line from the connection points of the plurality of mounting tabs.

12. The curtain airbag of claim 7, wherein the strap includes a tear line configured to tear off by a deployment pressure of the curtain airbag cushion and located on the strap between the plurality of strap lines and connection points of the plurality of mounting tabs to separate the plurality of strap lines from the connection points of the plurality of mounting tabs.

* * * * *